May 5, 1970  Y. CONSEILLER ET AL  3,510,511
PROCESS FOR THE PRODUCTION OF ORGANIC ESTERS
Filed June 2, 1967
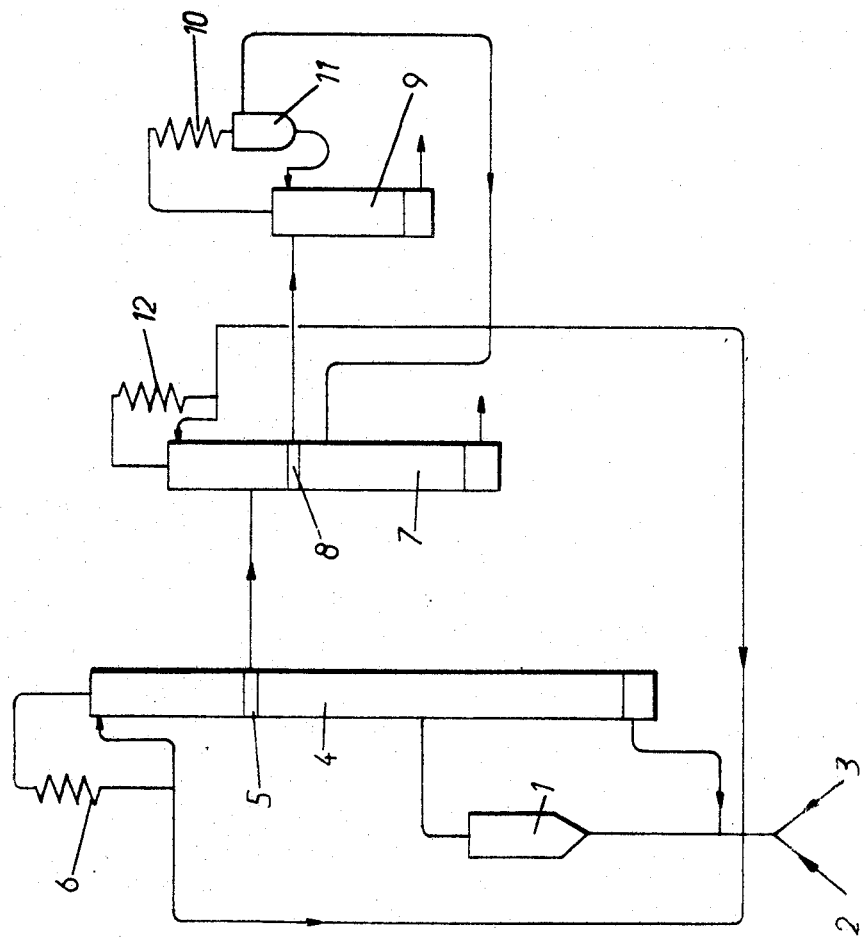

United States Patent Office 3,510,511
Patented May 5, 1970

3,510,511
PROCESS FOR THE PRODUCTION OF
ORGANIC ESTERS
Yvon Conseiller, Paris, Gerard Fontaine, Choisy-le-Roi,
and Andre Quiquempois, Nogent-sur-Marne, France,
assignors to Rhone-Poulenc S.A., Paris, France, a
French body corporate
Filed June 2, 1967, Ser. No. 643,067
Claims priority, application France, June 6, 1966,
64,312
Int. Cl. C07c 67/00
U.S. Cl. 260—496                                    6 Claims

ABSTRACT OF THE DISCLOSURE

Carboxylic alkyl esters, especially lower alkyl lower alkanoates such as ethyl acetate, are made by adding a mixture of carboxylic acid and alkyl ether to a mixture of sulphuric acid and the same ether under conditions such that the ester is removed as it is formed and the reaction mixture consists essentially of sulphuric acid and the said ether.

---

The present invention relates to the production of organic esters from carboxylic acids (or materials convertible thereto) and ethers and more particularly to the production of ethyl acetate from acetic acid and diethyl ether.

It is known that ethers react with sulphuric acid to give an acid alkyl sulphate and a dialkyl sulphate. It is also known that esters may be obtained by the action of the corresponding carboxylic acid on a dialkyl sulphate or on an acid alkyl sulphate.

The present invention provides a process for the preparation of carboxylic alkyl esters which comprises introducing a dialkyl ether and a carboxylic acid simultaneously, in a proportion of two mol. of carboxylic acid to one mol. of ether, into a mixture essentially consisting of sulphuric acid and the said ether in a proportion such that the boiling point of the mixture is that desired for the reaction, extracting the vapours evolved from the reaction mixture, and isolating the constituents thereof.

The new process is especially applicable to the production of ethyl acetate from diethyl ether and acetic acid, but is also useful, inter alia, in the production of other esters of alkanols of 1 to 4 carbon atoms with alkanoic acids of 1 to 4 carbon atoms.

By a suitable apparatus it is possible continuously to carry out the reaction, to separate the final reaction products and recycle the products unaffected by the reaction, and obtain a substantially quantitative total yield.

It has been found that, while the reaction of the carboxylic acid with the alkyl sulphate is facilitated by a strong concentration of carboxylic acid in the medium, the reaction of the ether with the sulphuric acid, which produces the alkyl sulphate, is very unfavourably affected by the same factor. Therefore, if it is desired to prepare carboxylic alkyl ester starting with an alkyl ether and a carboxylic acid in sulphuric acid medium, in accordance with the present invention, it is the rate at which the alkyl sulphate is formed that finally governs the speed of the total reaction.

Thus, in a reaction medium containing ethyl ether and sulphuric acid, into which acetic acid is introduced, but which contains no ethyl acetate and no ethyl sulphate, the instantaneous rate of formation of the ethyl acetate approximately doubles when the ratio of the molecular concentration of the acetic acid to that of the sulphuric acid changes from two to one-third.

The new process can therefore be carried out in such manner as to react the ether with the acetic acid in the liquid phase in the presence of sulphuric acid under conditions such as to profit by the maximum possible reaction speed, so that excellent productivity results.

It is desirable to operate under conditions such that the reaction medium always contains little carboxylic acid and alkyl sulphate and very little of the ester formed and of water. Preferably, in the case of the preparation of ethyl acetate, the operating conditions should be such that, in the reaction medium, the carboxylic acid concentration is below 3 mol. per litre and the ester concentration below 2 mol. per litre.

It is to be understood that a process of the same type, in which, however, the conditions employed are less favourable from the viewpoint of the kinetics of the reaction fall within the scope of the present invention, although not deriving the maximum advantage therefrom.

In the preparation of ethyl acetate the temperature of the reaction medium should be between 100° C. and 140° C. and preferably from 115° to 125° C.

The new process will be described in more detail for the particular case of the preparation of ethyl acetate from diethyl ether and acetic acid. Other esters may be prepared similarly making obvious modifications required by the physical and chemical characteristics of the materials employed.

The new process is particularly advantageous for continuous operation, and the preparation of ethyl acetate with apparatus appropriate for this type of operation will therefore be described. This apparatus is shown diagrammatically in the accompanying drawing.

For preparing ethyl acetate, a reactor 1 containing a mixture of concentrated sulphuric acid and of ethyl ether, is simultaneously supplied with acetic acid and ethyl ether in a proportion of 1 mol. of ether to 2 mol. of acid.

It has been found that the best proportion of sulphuric acid and ethyl ether in the mixture constituting the initial reaction medium is from 0.7 to 1.3 mol. of sulphuric acid and preferably from 0.9 to 1.1 mol. per mol. of ether. The reaction mixture is maintained at the boiling point.

The acetic acid and the ethyl ether are continuously introduced into the bottom of the reactor by any appropriate means, preferably by means of two pumps 2 and 3 which may optionally be coupled. This reactor may be a recycling evaporator, a simple chamber or one comprising baffles or jackets or any other device having the object of ensuring a certain period of contact between the carboxylic acid, the ether and the reaction medium. Instead of the reactor being supplied with liquid reactants as indicated, these reactants may be evaporated before they enter the reactor, in which the vapours are maintained for a predetermined time.

It is advantageous to treat the vapours leaving the reactor so as to separate the products of the reaction and to recycle the unreacted products. The described sequence of the apparatus illustrated in FIG. 1 constitutes a preferred assembly for carrying out this phase. Of course, variants of this apparatus are conceivable, such variants falling within the scope of normal technological variants.

The vapours leaving the reactor may be treated continuously substantially as follows:

The vapours leaving the reactor 1, which consist of a mixture of diethyl ether, ethyl acetate, water and acetic acid, are conducted into the central part of a distillation column 4 essentially charged with ester. This column may be of any type, but is preferably of the plate type, and comprises a decanting element 5 (such as a decanting plate).

The mixture undergoes a first fractionation therein which gives:

at the bottom of the column, acetic acid free from ester and water;

at the top of the column, ether free from ester;

by an intermediate extraction at 5 a mixture highly enriched in ester, but containing water and a little ether.

The acetic acid may be recycled into the reactor.

The ether is condenser in a condenser 6. A part returns to the top of the column 4 to effect the refluxing, while the remainder is recycled to the reactor 1, either in the liquid state or preferably in the state of superheated or non-superheated vapour.

In another arrangement, the vapours arriving at the top of the column 4 may undergo a simple dephlegmation at a temperature between 35° and 40° C. and be conducted either into the upper part of a column 7 or directly into the reactor 1.

The mixture leaving the intermediate extraction is sent into the central portion of the column 7, which is of any type, but preferably of the plate type, with a decanting element 8, and in which it is fractionated in the following fractions:

at the top, the ether free from ester, which is partly recycled to the top of the column and partly to the reactor 1;
at the bottom, the ester;
by intermediate extraction at a decanting element 8, the water produced by the reaction.

The water thus extracted may contain a little dissolved ester, and it is then conducted to the top of a small column 9, at the base of which the water A leaves free from ester. At the top of this column, the ester-water azeotrope is condensed in a condenser 10 and decanted into an element 11, from which the aqueous layer is returned to the top of 9 and the organic layer is directed to the lower part of 7.

It is obvious that the fractionation of the various mixtures encountered above does not take place under the same conditions for all the esters which it may be desired to produce in this way, but that there corresponds to each ester a certain adjustment of the installation. Thus, if the ester is substantially insoluble in water, the column 9 is unnecessary, but generally speaking the arrangement of the various constituents in the columns remains the same.

The optimum adjustment of the distillation assembly according to the invention may be determined from an analysis of the liquids extracted at various points, or in the course of operation, with the temperature at different levels.

It is to be understood that a distillation assembly specially adapted to the application of the present process (for example that diagrammatically illustrated in the figure) forms part of the invention.

All the above-described operations may be carried out under reduced pressure, although this reduces the speed of the reaction by reducing the solubility of the ether in the reaction medium, under normal pressure, or under superatmospheric pressure. In the latter case, the speed of the reaction is appreciably increased and the volume of the apparatus as a whole is reduced.

There may obviously be produced in the course of the reaction a small proportion of by-products such as alcohol, which are, if necessary, eliminated in known manner in the course of the distillations.

The following example illustrates the invention.

EXAMPLE

The reactor 1 is a round-bottomed, two-liter, four-necked flask, the useful volume of which is 0.7 to 0.8 liter. It is heated by an electric flask heater. The column 4 is a glass column 50 mm. in diameter comprising 40 apertured plates. The vapours leaving the reactor are introduced into the column 4 between the 20th and 21st plates from the bottom.

An extraction is effected at the 30th plate. Thermometers are disposed in the boiler of the column 4 and at the 4th, 30th, 36th and 40th plates of this column. The boiler consists of a six-liter three-necked round-bottomed flask heated by an electric flask heater. The pumps 2 and 3 are metering pumps adapted to deliver from 0 to 3 liters per hour each.

The acetic acid and the ether are separately conducted into the reactor through two descending tubes after having been evaporated in two recycling evaporators.

7 is a glass column packed with Raschig rings to a height of 2 metres. A decanting element is disposed at 140 cm. from the bottom of the column. The boiler consists of a two-liter round-bottomed flask heated by an electric flask heater. 9 is a glass column packed with Raschig rings to a height of 50 cm.

In order to start the operation, the reactor is filled with 0.560 kg. of sulphuric acid (66° B.) and 0.370 kg. of ether is gradually fed into the reactor. The column 4 is set in operation with an initial charge of ether, acetic acid and ethyl acetate such that the following temperatures are established:

|  | ° C. |
|---|---|
| At the bottom | 118 |
| At the 4th plate | 110±2 |
| At the 30th plate | 60±2 |
| At the 36th plate | 48±2 |
| At the top | 34 to 35 |

The column 7 is previously charged with ether, ethyl acetate and water in such manner that the temperatures along this column are as follows:

|  | ° C. |
|---|---|
| At the top | 34 |
| At the decanter 8 | 71 |
| At the base | 77 |

The column 9 is previously charged with ethyl acetate and water so as to establish a temperature in the neighbourhood of 71° C. at the top and of 100° C. at the base.

The ether drawn from the top of 4 is recycled into the reactor 1 after evaporation. The acetic acid is supplied by the pump 2 at a rate of 628 ml./h., i.e. 11 mol./h.

The degree of reflux at the top of the column 4 is so adjusted that the temperature at the 36th plate remains equal to 48°±2° C. The extraction from the 30th plate of the column 4 is so adjusted that the temperature at the 4th plate remains equal to 110°±2° C. The rate of introduction of ether by means of the pump 3 and the heating of the reactor 1 are so adjusted as to maintain a temperature of 120° C. in the reactor.

The unconverted acetic acid is collected at the bottom of the column 4 and is not recycled.

While the installation is operating normally, there is withdrawn at the level of the 30th plate of the column 4 an organic layer whose composition is as follows:

|  | Percent v./v. |
|---|---|
| Ethyl acetate | About 75 |
| Ether | About 20 |
| Water | About 5 |

This mixture is sent into the column 7 from which there are withdrawn:

at the head, the ether which is recycled into the reactor 1 after evaporation;
at the base, ethyl acetate;
from the decanter, water saturated with ethyl acetate at 71° C. This mixture is exhausted of ethyl acetate in the column 9.

Under these conditions, the production of ethyl acetate is 7.25 mol./h.

We claim:

1. Process for the preparation of an ester of an alkanol of 1 to 4 carbon atoms with an alkanoic acid of 1 to 4 carbon atoms, which comprises continuously introducing an ether of a said alkanol and a said alkanoic acid simultaneously, in a proportion of two mol of said acid to one mol of said ether, into a boiling mixture initially consisting essentially of sulphuric acid and the said ether in a proportion of 0.7 to 1.3 mol of sulphuric acid per mol of said ether, continuously extracting the vapours evolved from the reaction mixture, and isolating the constituents thereof.

2. Process according to claim 1 in which substantially all the ester and water formed by the reaction are removed from the reaction mixture as vapour as soon as they are formed.

3. Process according to claim 1 in which ethyl acetate is produced from acetic acid and diethyl ether.

4. Process according to claim 3 in which the reaction temperature is 100° to 140° C.

5. Process according to claim 4 in which the reaction temperature is 115° to 125° C.

6. Process according to claim 3 in which the carboxylic acid concentration in the reaction mixture is less than 3 mol per liter and the ester concentration is less than 2 mol per liter.

References Cited

UNITED STATES PATENTS 2,030,835   2/1936   Cox et al. _____ 260—496

LORRAINE A. WEINBERGER, Primary Examiner

V. GARNER, Assistant Examiner

U.S. Cl. X.R.

260—492